April 2, 1963     C. T. LEWIS     3,083,431

SAFETY SNAP HOOK

Filed Aug. 29, 1961

INVENTOR.
CHARLES T. LEWIS
BY
Fishburn and Gold
ATTORNEYS

United States Patent Office 3,083,431
Patented Apr. 2, 1963

3,083,431
SAFETY SNAP HOOK
Charles T. Lewis, Oklahoma City, Okla.
Filed Aug. 29, 1961, Ser. No. 134,632
4 Claims. (Cl. 24—234)

This invention relates to snap hooks, and more particularly to a safety snap hook which will not accidentally open or release.

The present invention contemplates a safety snap hook particularly for use by persons working at elevations above the ground wherein the hooks are fastened to a supporting belt, life line or the like which, in turn, is connected by the hook to a belt worn by the user. It is common practice for the body belts and other supports to have metal rings to which the snap hooks are connected, and frequently said metal rings are in the form of D-rings or O-rings wherein the rings are in the shape of the capital letter D or letter O respectively. It is common practice to use snap hooks having pivoted tongues or latches which are spring-loaded to urge same into normally closed position relative to the hook whereby a ring engaged with the hook will be prevented by the latch or tongue from being disengaged. However, the springs may break due to temperature, crystallization or otherwise fail and allow the tongue or latch to fall or move to open position while being used on a safety belt or safety line, creating a serious hazard of which the wearer is unaware until it is observed visually. Also, foreign objects may engage the latch or tongue and foul same while the wearer of the belt on the safety line is proceeding with his work. With either D or O rings connected to conventional snap hooks used on a belt or safety line, it is possible for the wearer to turn in such a position whereby the ring engages the tongue or latch and applies pressure thereto to open same and permit the ring to become disengaged by what is called a "roll-out," leaving the wearer unprotected by the safety line or the like.

The present invention contemplates a safety snap hook having a guard overlying the usual snap tongue or latch to protect same from being opened by a pressure of the D- and O-rings engaged by the hook wherein the guard is movable to apply pressure to the snap tongue or latch for opening same by one hand of the user, but in normal closing position serves to guard against fouling or accidental disengagement of a ring from the hook.

The principal objects of the present invention are to provide a safety snap hook having a guard overlying the snap tongue or latch with free end portions positioned alongside of the nose or extremity of the hook; to provide such a structure wherein the guard portions shield the outer portions of the latch or tongue from engagement with the rings or other objects thereby preventing "roll-outs" or other accidental disengagement; to provide such a safety snap hook with a guard overlying the snap tongue or latch and manually movable in response to pressure to the latch to move the guard and latch to hook opening positions; to provide such a structure with a guard in the form of a spring member normally positioned to close the hook and bendable toward the body of the hook with the same motion as is normally used in moving the tongue or latch to open position; to provide such a structure with a guard which tends to minimize the catching of any parts of the hook on any elements that might interfere with its normal use; to provide a safety snap hook with a minimum of parts that is economical to manufacture in a sturdy structure that will stand a maximum of abuse under severe operating conditions and that will prevent accidental disengagement of the ring from the hook and particularly prevent roll-out disengagement.

Other objects and advantages of this invention will become apparent from the following description taken in connection with the accompanying drawings wherein are set forth by way of illustration and example certain embodiments of this invention.

Figure 1:
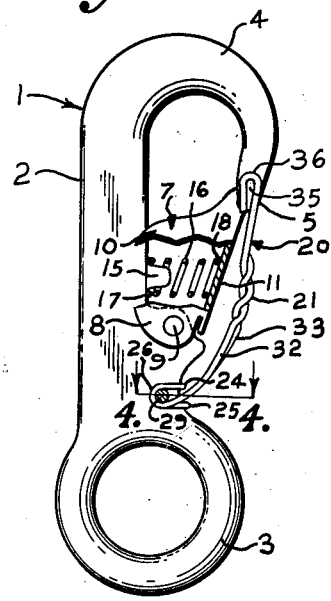
FIG. 1 is a side elevational view of a safety hook embodying the features of the present invention with portions broken away to illustrate the latch spring.
Figure 2:
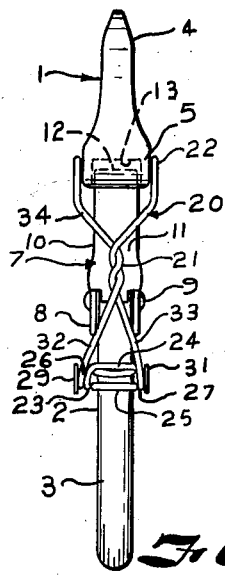
FIG. 2 is an elevational view of the safety hook looking toward the guard.
Figure 4:
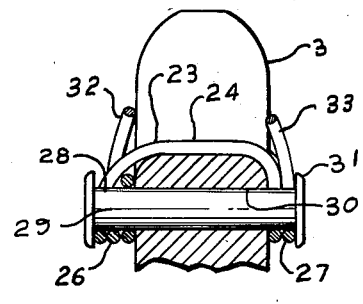
FIG. 4 is a sectional view through the hook and guard mounting taken on the line 4—4, FIG. 1.

Referring more in detail to the drawings:

The reference numeral 1 generally designates a safety hook having an elongate body or shank 2 provided with a connector member which is illustrated as an open eye or loop 3 at one end of the shank and preferably integral therewith. The eye may be of any suitable form for receiving a rope, strap or fastener for suitably securing the hook to a line, belt or the like. At the other end of the shank is a rearwardly turned portion forming a hook member or element 4 having an extremity in the form of a hook prong or nose 5. The nose 5 is spaced from the shank 2 to define an entrant opening 6.

A spring-loaded latch or tongue 7 is mounted on the body and normally engages the nose 5 to close the opening 6. In the illustrated structure, the latch 7 is formed of sheet metal in a shape having a generally U-shaped cross section. The latch member has one end portion 8 pivotally mounted on the shank by means of a pivot pin 9, the pivotal point being spaced from the nose 5 toward the eye 3. The U-shaped member has sides or flanges 10 and is arranged relative to the shank whereby it straddles or embraces the shank 2. The U-shaped member has a bar portion 11 between the sides 10 with an end 12 remote from the pivot pin 9 normally engaging the nose 5. In the illustrated structure, the portion of the nose toward the shank 2 has a recess 13 and the latch end 12 is narrower than the nose portion of the hook and extends into said recess whereby side portions 14 defining the recess protect the latch against lateral displacement. In the illustrated structure, the shank 2 has a boss or projection 15 extending generally toward the nose 5 and a spring 16 has one end 17 engaged over said projection and the other end 18 engaging the bar 11 between the sides 10 to bias the latch into engagement of the end 12 thereof with the nose 5. The hook body and biased latch illustrated are exemplary and it is to be understood that the particular structure may be varied or other conventional snap hook structures utilized.

Figure 3:
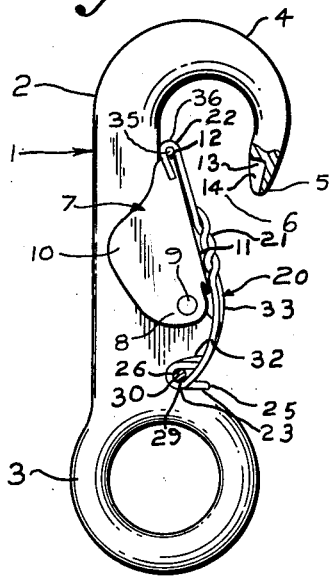
FIG. 3 is a side elevational view of the safety snap hook with the guard and latch moved to hook opening position.
Figure 5:
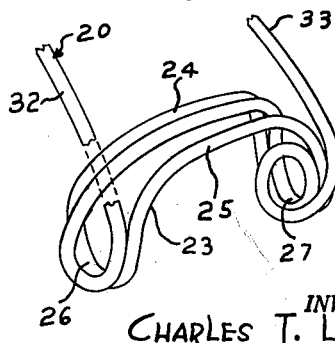
FIG. 5 is a partial perspective view of the mounting end of the guard.

The snap hook 1 has a guard 20 mounted on the body with a portion 21 overlying the bar 11 of the latch 7, with free ends 22 lying alongside of the nose 5 in straddling relation thereto. The guard is arranged whereby it normally remains in the same position relative to the nose and resists movement toward or away from the shank but is movable by force as by the hand of a user and applied to the guard in the direction of the latch whereby the guard will engage the latch and move both the guard and latch to open position, as illustrated in FIG. 3. In the structure illustrated, the guard 20 is formed of resilient or spring metal with an end 23 remote from the fingers 22 mounted on the body adjacent to the eye 3. The end 23 is generally U-shaped straddling the shank and with portions 24 and 25 engaging said body or shank to resist movement of the guard at the mounting whereby movement of the guard portion overlying the latch is through bending or flexing of said guard member, and such movement provides a spring tension tending to return the guard to the position closing the opening 6 with the fingers 22 alongside of the nose 5.

In the structure illustrated, the guard is formed from a single piece of spring wire with spaced loop-like portions 26 and 27 sleeved on laterally projecting lugs or end portions 28 of a pin 29 extending through a bore 30 in the body or shank, said pin preferably having headed ends 31 to retain the loops on the pin. The lop portions 26 and 27 are connected by bar portions 24 and 25 extending laterally and over the side of the shank toward the nose whereby said bars and loops straddle the shank with the bars being spaced apart tending to hold the mounting portion of the guard stationary relative to the shank. Laterally spaced members 32 and 33 extend from the loop portions 26 and 27 respectively and are turned inwardly to converge and are twisted in the portion 21 overlying the latch with the free ends diverging from the twisted portion as at 34 and terminating in the fingers 22 which have ends turned rearwardly to form rounded ends 35 as on loops 36 to reduce tendency of any foreign object to catch on the free end portions of the guard. The finger portions are positioned outwardly from the latch, and in effect form a continuation of the nose whereby any foreign object moving thereover tends to slide by the latch without applying opening pressure thereto. The arrangement of the guard is such that it is substantially protected from engagement of foreign objects that would tend to swing same or bend same outwardly relative to the latch, yet it is bendable by force applied as by a thumb of the hand to bend same toward the shank into engagement with the bar 11 of the latch to move the latch to open position. This provides the extra spring tension of the guard member required to be overcome to effect opening of the latch, thereby adding greater safety. In the event of breakage or other failure of the latch spring 16 whereby the latch could fall to open position, the guard still provides a closure to the opening that would tend to prevent accidental disengagement of the hook from a ring or the like. The guard also prevents foreign objects from engaging and fouling the latch. In the event a D-ring or O-ring moves through turning of the wearer whereby a portion would tend to overlie the latch and effect a roll-out disconnection of the ring from the hook, the guard holds the ring from engaging the bar portion of the latch and effectively prevents such roll-out disconnection.

In using a hook constructed and assembled as described, with the hook on a safety line or the like, in order to insert a ring into the engagement with the hook, a portion of the ring is placed on the guard portion 21 in overlying relation to the latch and forced toward the body, bending the guard and swinging the latch to open position, whereby the ring may pass through the opening 6 and become engaged with the hook, the ring remaining engaged with the hook until manually released by a wearer using one hand pressing the guard and latch as with the thumb while the fingers engage the shank to move the guard and latch to open position, as illustrated in FIG. 3, whereby the ring may be disengaged from the hook.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A safety snap hook structure comprising, a body having a hook end, a spring-loaded latch, means pivotally connecting said latch to said body in spaced relation to hook end with said latch extending to a normally closed position with one end adjacent the extremity of said hook end, said latch being swingable on said body to position said one end of the latch adjacent the body in hook opening position, an elongate guard overlying said latch and having one end remote from said hook end, means connecting said one end of the guard to said body in substantially fixed relation thereto, diverging fingers adjacent the other end of said guard and terminating alongside of the extremity of said hook end, the connection of said one end of the guard with the body normally holding the guard in position with the fingers alongside of the extremity of said hook end, said guard being resilient whereby force exerted thereon toward the latch will bend said guard to move the overlying portion and fingers thereof and the latch to hook opening position.

2. A safety snap hook structure comprising, a body having a hook end, a spring-loaded latch, means pivotally connecting said latch to said body in spaced relation to said hook end with said latch extending to a normally closed position with one end adjacent the extremity of said hook end, said latch being swingable on said body to position said one end of the latch adjacent the body in hook opening position, an elongate guard overlying said latch and having one end of said guard remote from said hook end and the other end adjacent to and spaced from said hook end extremity, means connecting said one end of the guard to said body in substantially fixed relation thereto, and spaced fingers at said other end of said guard and extending therefrom alongside of the extremity of said hook end, said fingers having rounded free ends, the connection of said one end of the guard to the body normally holding the guard in spaced relation to the latch and with the fingers alongside of the extremity of said hook end, said guard being resilient whereby force exerted thereon toward the latch will bend said guard to move the overlying portion and fingers thereof and the latch to hook opening position.

3. A safety snap hook structure comprising, a body having a hook end, a spring-loaded latch of U-shaped cross section having side flanges extending over opposite sides of said body, means pivotally connecting said latch to said body in spaced relation to said hook end with said latch extending to a normally closed position with one end adjacent the extremity of said hook end, said latch being swingable on said body to position said one end of the latch adjacent the body in hook opening position, an elongate guard overlying said latch, a U-shaped portion adjacent one end of said guard remote from said hook end, said U-shaped portion engaging said body and having side portions extending over opposite sides of said body, means connecting said side portions of the U-shaped end of the guard to said body, diverging fingers adjacent the other end of said guard and terminating alongside of the extremity of said hook end, the engagement of the U-shaped portion of the guard with the body tending to hold the guard in position with the fingers alongside of the extremity of said hook end, said guard being resilient whereby force exerted thereon toward the latch will bend said guard to move the overlying portion and fingers thereof and the latch to hook opening position.

4. A safety snap hook structure comprising, a body having a hook end, a spring-loaded latch of U-shaped cross section having side flanges extending over opposite sides of said body, means pivotally connecting said latch to said body in spaced relation to said hook end with said latch extending to a normally closed position with one end adjacent the extremity of said hook end, said latch being swingable on said body to position said one end of the latch adjacent the body in hook opening position, an elongate guard of resilient wire overlying said latch, said wire guard having a U-shaped portion adjacent one end of said guard remote from said hook end, said U-shaped portion engaging said body and having side loops extending over opposite sides of said body, lateral lugs on said body engaged in said loops to connect said U-shaped end of the guard to said body, and diverging fingers adjacent the other end of said guard and terminating in rounded ends alongside of the extremity of said hook end, the engagement of the U-shaped portion of the guard with the body tending to hold the guard in position with the fingers alongside of the extremity of said hook end, said guard being resilient whereby force exerted thereon toward the latch will bend said guard to move the overlying portion and fingers thereof and the latch to hook opening position.

References Cited in the file of this patent

UNITED STATES PATENTS

| | | |
|---|---|---|
| 69,072 | Butler | Sept. 24, 1867 |
| 797,941 | Corbett | Aug. 22, 1905 |
| 1,061,435 | Witt | May 13, 1913 |
| 1,256,101 | Baxter | Feb. 12, 1918 |
| 1,949,608 | Johnson | Mar. 6, 1934 |
| 2,514,656 | Manson | July 11, 1950 |

FOREIGN PATENTS

| | | |
|---|---|---|
| 128,412 | Great Britain | June 26, 1919 |